US006498412B2

(12) United States Patent
Horng (10) Patent No.: US 6,498,412 B2
(45) Date of Patent: Dec. 24, 2002

(54) FIXING STRUCTURE FOR A ROTOR OF A BRUSHLESS MOTOR

(75) Inventor: Yin-Rong Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 2 days.

(21) Appl. No.: 09/769,349

(22) Filed: Jan. 26, 2001

(65) Prior Publication Data

US 2002/0101124 A1 Aug. 1, 2002

(51) Int. Cl.[7] .............................. H02K 5/00; H02K 1/18; H02K 1/28
(52) U.S. Cl. ......................................... 310/91; 310/218
(58) Field of Search .................................... 310/91, 218

(56) References Cited

U.S. PATENT DOCUMENTS

| | | | | |
|---|---|---|---|---|
| 3,483,888 A | * | 12/1969 | Wurzel | 137/539 |
| 4,682,065 A | * | 7/1987 | English et al. | 310/156.26 |
| 4,987,331 A | * | 1/1991 | Horng | 310/152 |
| 5,679,997 A | * | 10/1997 | Matsuzawa et al. | 310/164 |
| 5,982,066 A | * | 11/1999 | Marracino et al. | 310/91 |
| 6,000,919 A | * | 12/1999 | Hsieh | 415/220 |
| 6,023,117 A | * | 2/2000 | Chen | 310/68 R |
| 6,040,649 A | * | 3/2000 | Horng | 310/67 R |
| 6,246,140 B1 | * | 6/2001 | Horng | 310/40 MM |
| 6,353,274 B1 | * | 3/2002 | Ogawara et al. | 310/91 |
| 6,368,039 B2 | * | 4/2002 | Wolfe et al. | 411/526 |
| 6,400,054 B1 | * | 6/2002 | Horng | 310/91 |

* cited by examiner

Primary Examiner—Nestor Ramirez
Assistant Examiner—Pedro J. Cuevas
(74) Attorney, Agent, or Firm—Bacon & Thomas (57) ABSTRACT

A brushless motor comprises a casing including an axle seat with an axle hole, the axle hole having a flange provided therein. An axle tube is engaged on the axle seat and includes a bearing mounted therein for rotatably holding a shaft of a rotor. The shaft includes a distal end that extends beyond an end face of the bearing, the distal end including a neck to thereby define an annular groove. An engaging member mounted in the axle hole of the axle seat and retained in place by the bearing or the axle tube. The engaging member includes a hole having an inner diameter smaller than a diameter of the shaft of the rotor. An inner peripheral wall defining the hole of the engaging member includes a plurality of notches to thereby allow forcible passage of a distal end of the shaft through the hole of the engaging member. The peripheral wall of the hole of the engaging member is located in the annular groove of the shaft after the distal end of the shaft is passed through the hole of the engaging member.

10 Claims, 8 Drawing Sheets

FIXING STRUCTURE FOR A ROTOR OF A BRUSHLESS MOTOR

BACKGROUND OF THE INVENTION

1. Field of the Invention

The present invention relates to a fixing structure for a rotor, and, more particularly, to a rotor of a brushless motor that can be detached and assembled easily.

2. Description of the Related Art

Figure 1:
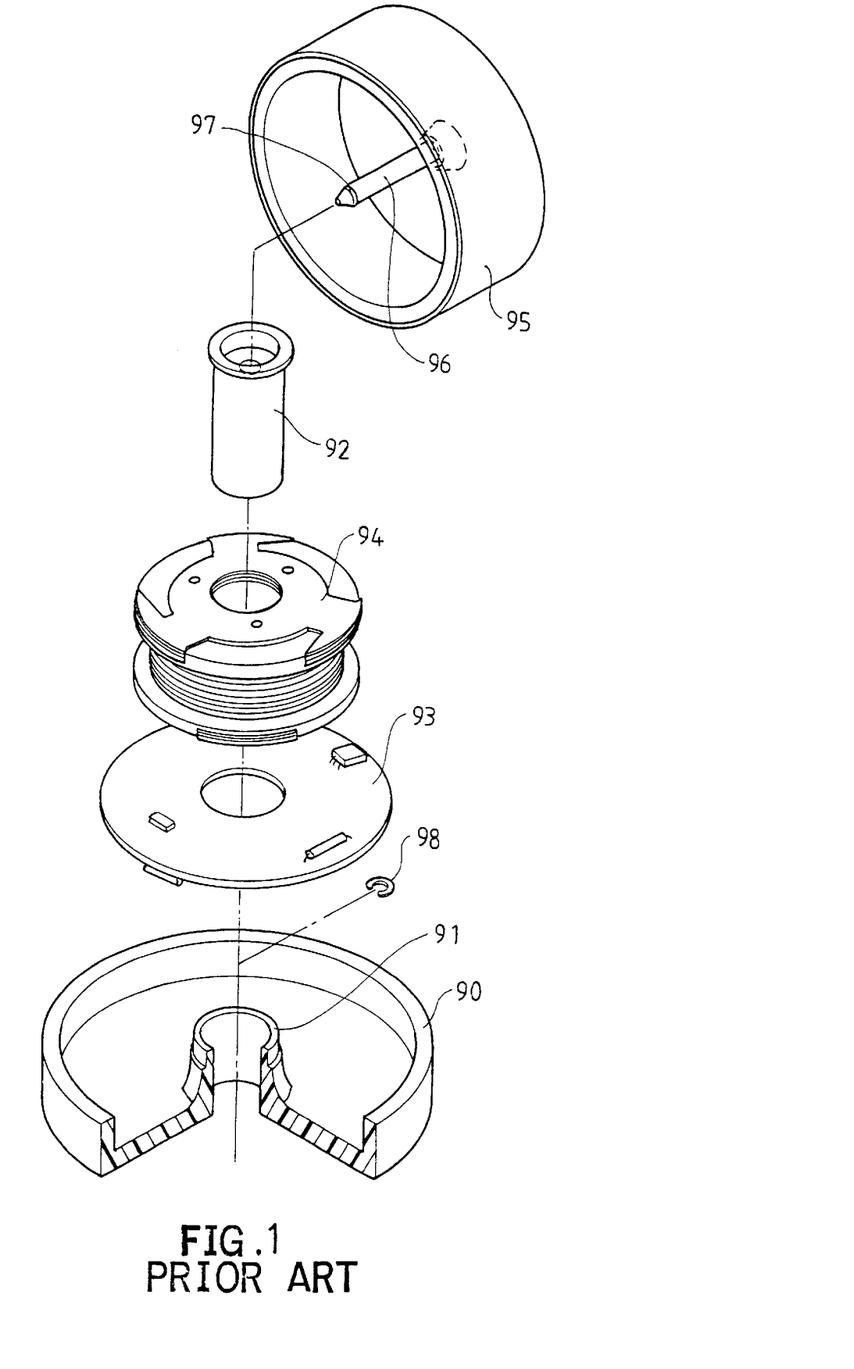
FIG. 1 is an exploded perspective view of a conventional brushless motor.
Figure 2:
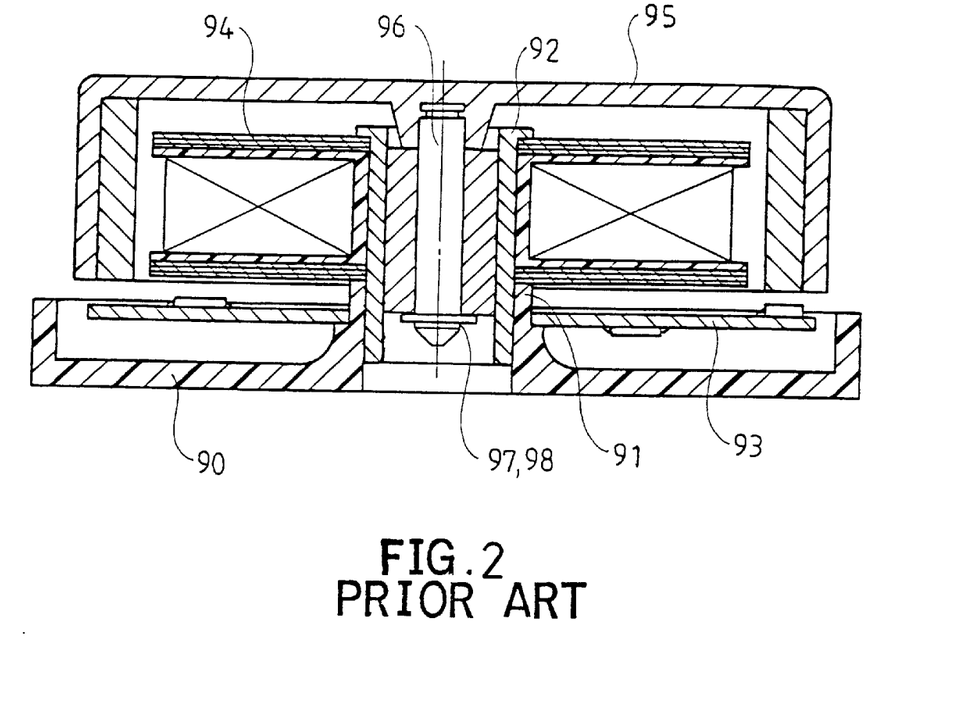
FIG. 2 is a sectional view of the conventional brushless motor.

FIGS. 1 and 2 illustrate a conventional brushless motor comprising a casing 90 with an axle seat 91 for mounting an axle tube 92. Mounted around an outer periphery of the axle tube 92 are a circuit board 93 and a stator bobbin 94. The axle tube 92 includes a bearing mounted to an inner periphery thereof for rotatably holding a shaft 96 of a rotor 95. The shaft 96 includes an annular groove 97 for engaging with a C-clip 98.

In assembly, the axle tube 92 is extended through the circuit board 93 and the stator bobbin 94 and then engaged with the axle seat 91 of the casing 90, and the shaft 96 of the rotor 95 is extended through the bearing in the axle tube 92 and then retained in place by means of engaging the C-clip 98 into the annular groove 97 of the shaft 96. Thus, the rotor 95, circuit board 93, and stator bobbin 94 together constitute a brushless motor.

However, as illustrated in FIG. 2, mounting of the C-clip 98 into the annular groove 98 of the distal portion of the shaft 96, so that a side of the C-clip 98 presses against an end face of the bearing, is difficult because the distal portion of the shaft protrudes only slightly beyond the bearing in the axle tube 92. It was found that about 20%~30% of the brushless motors cannot pass the quality test after assembly, and the rejected brushless motors must be detached and retested and/or have their elements replaced. The first step of detachment is to remove the C-clip 98 from the annular groove 97 of the shaft 96, and the C-clip 98 is thus damaged and cannot be used. In conclusion, detachment and assembly for such a conventional brushless motor is difficult and troublesome, and a C-clip is damaged in each detaching procedure. In addition, the C-clip 98 securely engaged in the annular groove 97 of the shaft 96 rotates together with the shaft 96 and thus generates noise as the C-clip 98 and the bearing would have friction therebetween.

SUMMARY OF THE INVENTION

It is the primary object of the present invention to provide a fixing structure for a rotor to allow easy assembly and detachment and to reduce rotational noise of the rotor.

A brushless motor in accordance with the present invention comprises a casing including an axle seat with an axle hole, the axle hole having a flange provided therein. An axle tube is engaged on the axle seat and includes a bearing mounted therein for rotatably holding a shaft of a rotor. The shaft includes a distal end that extends beyond an end face of the bearing, the distal end including a neck to thereby define an annular groove. An engaging member is mounted in the axle hole of the axle seat and retained in place by the bearing or the axle tube. The engaging member includes a hole having an inner diameter smaller than a diameter of the shaft of the rotor. An inner peripheral wall defining the hole of the engaging member includes a plurality of notches to thereby allow forcible passage of a distal end of the shaft through the hole of the engaging member. The peripheral wall of the hole of the engaging member is located in the annular groove of the shaft after the distal end of the shaft is passed through the hole of the engaging member.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 3:
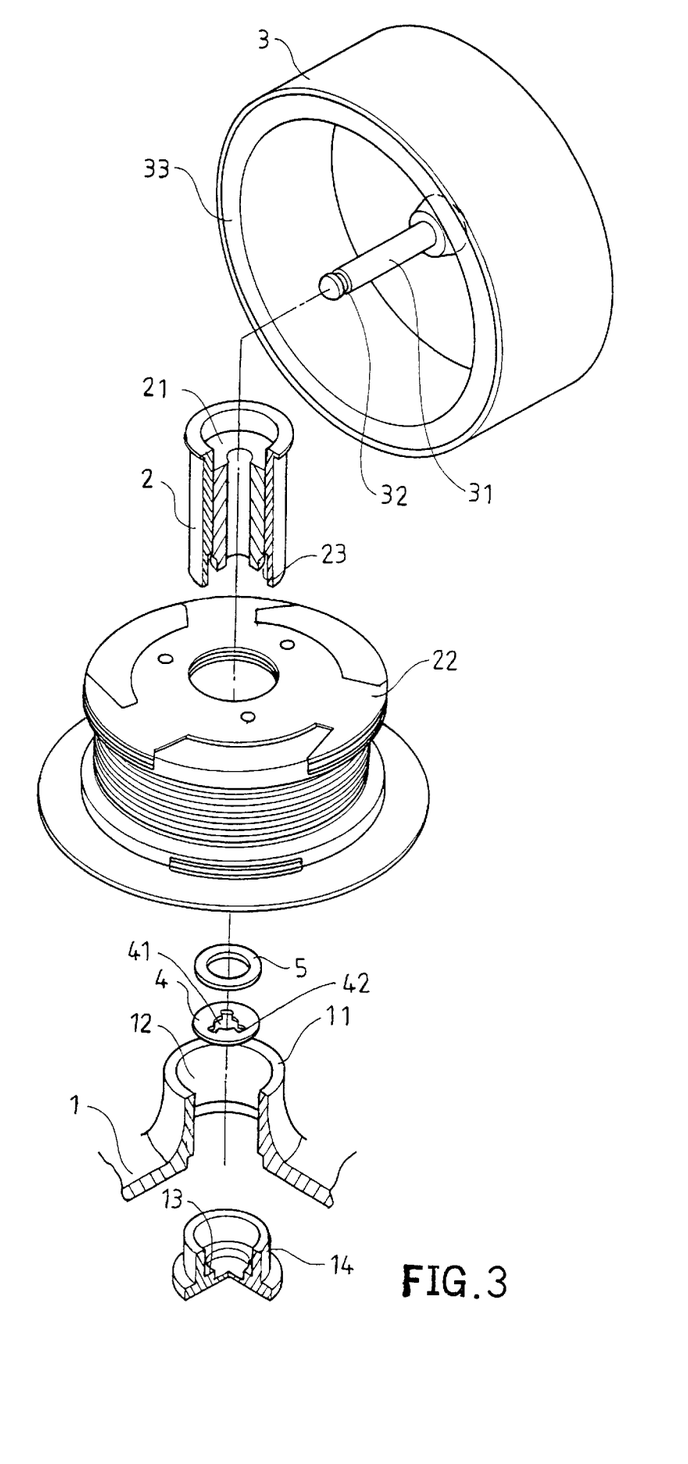
FIG. 3 is an exploded perspective view of a first embodiment of a brushless motor in accordance with the present invention.

Referring to FIG. 3, a first embodiment of a brushless motor in accordance with the present invention generally includes a casing 1, an axle tube 2, a rotor 3, an engaging member 4, and a fixing ring 5.

Figure 8:
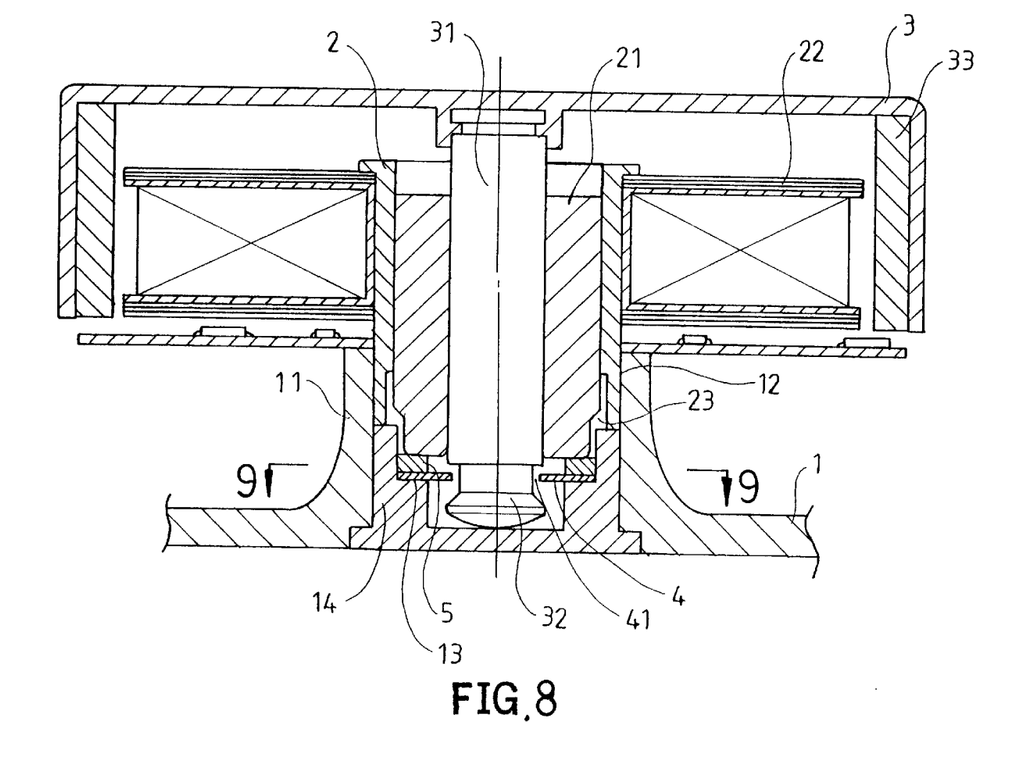
FIG. 8 is a sectional view of the brushless motor in accordance with the present invention.

The casing 1 can be any conventional casing for a motor or heat-dissipating fan. The casing 1 includes an axle seat 11 for mounting the axle tube 2. The axle seat 11 includes an axle hole 12 having an inner flange 13 formed on an inner periphery thereof. If necessary, a plug 14 may be provided to seal an end of the axle hole 12 and the inner flange 13 is formed on an inner peripheral wall of the plug 14, as shown in FIGS. 3 and 8.

The axle tube 2 is engaged to the axle seat 11 of the casing 1 and includes an outer periphery for mounting a stator bobbin 22. A bearing 21 is mounted in the axle tube 2 for rotatably holding a shaft 31 of the rotor 3. The bearing 21 may be a conventional ball bearing, oily bearing, or self-lubricating bearing. If necessary, the axle tube 2 and the bearing 21 may have a gap 23 therebetween that serves as a space for storing oil.

The rotor 3 includes a shaft 31 in a center thereof. The shaft 31 is rotatably received in the bearing 21 of the axle tube 2. The shaft 31 includes a neck (not labeled) defined in a distal end thereof, thereby forming an annular groove 32 that protrudes beyond an end face of the bearing 21 when the shaft 31 is mounted in the bearing 21 of the axle tube 2. Preferably, a distal end face of the shaft 31 is spherical. The rotor 3 includes a ring magnet 33 surrounding the stator bobbin 22.

Figure 4:
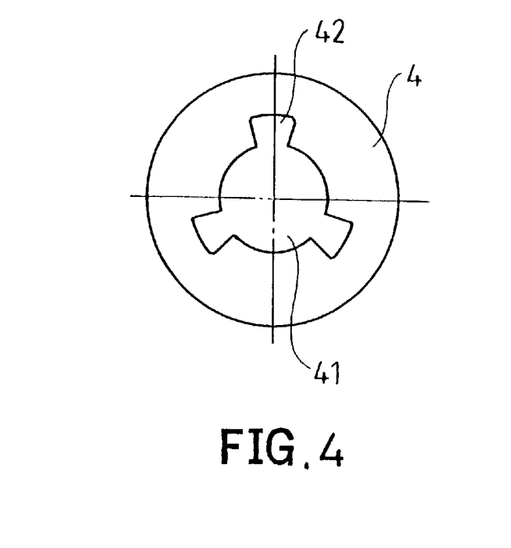
FIG. 4 is a top view of an engaging member of the brushless motor in accordance with the present invention.
Figure 5:
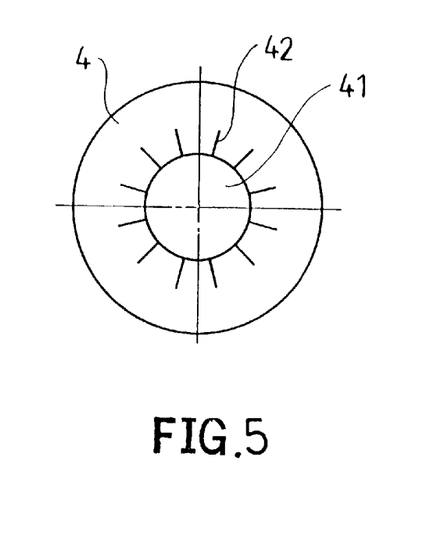
FIG. 5 is a top view similar to FIG. 4, illustrating a modified embodiment of the engaging member.
Figure 6:
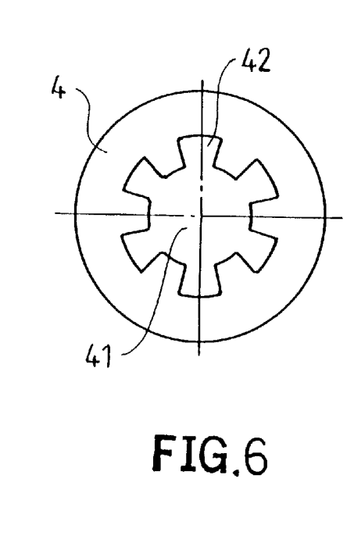
FIG. 6 is a top view similar to FIG. 4, illustrating a further modified embodiment of the engaging member.

The engaging member 4 is mounted to the inner flange 13 in the axle hole 12 of the axle seat 11. The engaging member 4 may include a hole 41 with a plurality of notches 42 defined in an inner peripheral wall thereof. The notches 42 can be of any desired shapes, and examples of which are shown in FIGS. 4 through 6. It is noted that a minimum inner diameter of the hole 41 of the engaging member 4 is slightly smaller than a diameter of the shaft 31 yet slightly greater than an outer diameter of the neck of the shaft 31.

Figure 7:
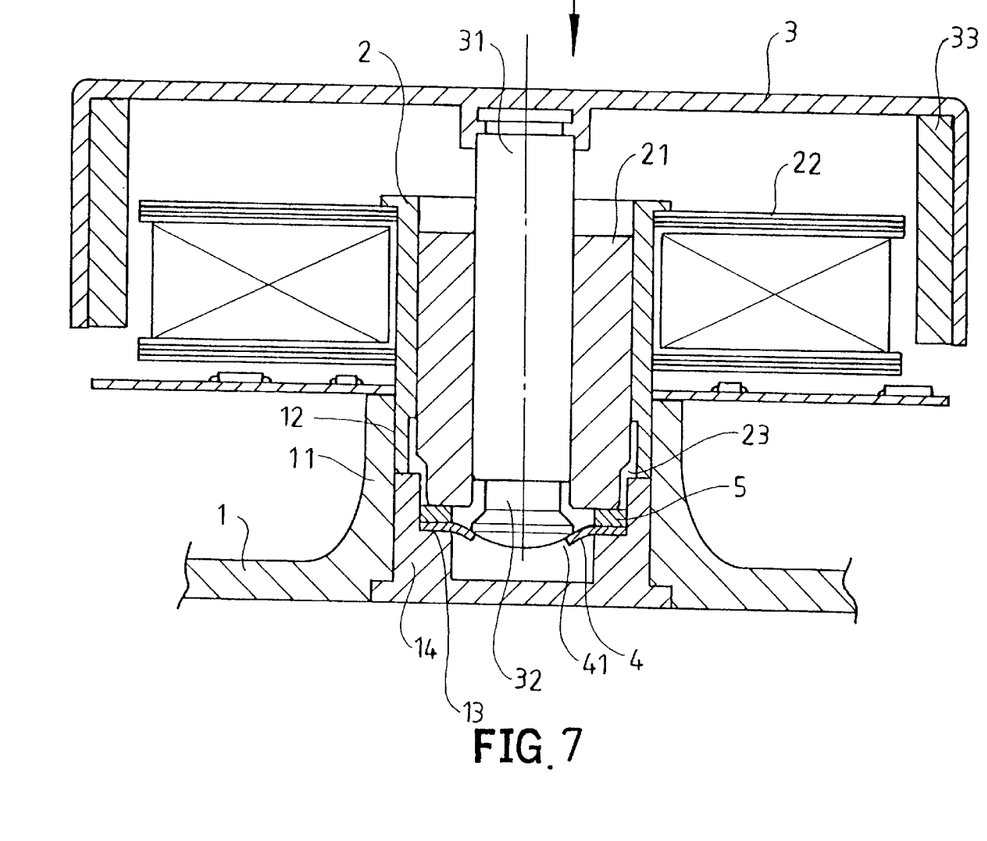
FIG. 7 is a sectional view illustrating assembly procedure of the first embodiment of the brushless motor in accordance with the present invention.

In assembly, as illustrated in FIG. 7, the shaft 31 may be applied with a relatively larger external force and thus be forced to pass through the hole 41 of the engaging member 4. The protruding portions of the inner peripheral wall of the opening 41 is within the annular groove 32 of the shaft 31 after assembly, as shown in FIG. 8. It is noted that the notches 42 in the inner periphery of the opening 41 allows the inner peripheral wall of the hole 41 to bend and deform during passage of the shaft 31, thereby allowing passage of the distal end of the shaft 31.

The fixing ring 5 includes a hole 51 having an inner diameter greater than an inner diameter of the hole 41 of the engaging member 4. As illustrated in FIG. 8, the fixing ring 5 and the engaging member 4 are mounted in the plug 14 and rest on the inner flange 13. The bearing 21 in the axle tube 2 bears against an upper side of the fixing ring 5, and a lower side of the fixing ring 5 presses against the engaging member 4, which is thus retained in place to the inner flange 13.

Figure 9:
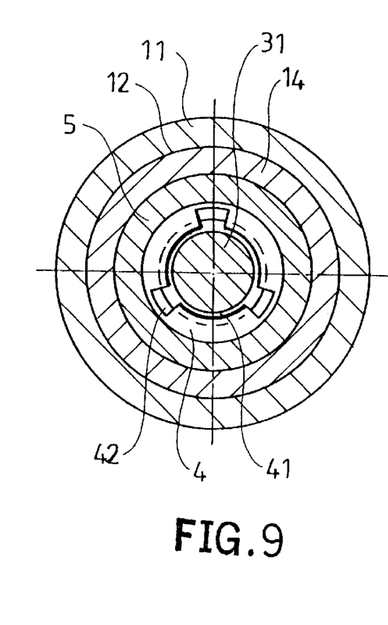
FIG. 9 is a sectional view taken along line 9—9 in FIG. 8.

In assembly, referring to FIG. 7, the fixing ring 5 and the engaging member 4 are mounted into the axle hole 12 of the axle seat 11 of the casing 1 and retained to the inner flange 13. Then, the axle tube 2 having the bearing 21 mounted therein and the stator bobbin 22 mounted therearound is mounted into the axle seat 11 with an end face of the bearing 21 bearing against the fixing ring 5, which, in turn, retains the engaging member 4 in place. Finally, the shaft 31 of the rotor 3 is extended through the hole of the bearing 21 and forcibly passed through the hole 41 of the engaging member 4. It is noted that the distal end of the shaft 31 has a spherical surface and the hole 41 of the engaging member 4 that is retained in place by the fixing ring 5 includes a plurality of notches 42 to allow deformation in the inner peripheral wall of the hole 41 during passage of the distal end of the shaft 31. After passing through the hole 41 of the engaging member 4, the inner peripheral wall of the hole 41 returns to its original position and is located in the annular groove 32 of the distal end of the shaft 31 without contacting the neck of the shaft 31, as shown in FIG. 8. It is noted that disengagement of the rotor 3 is prevented by the engaging member 4, as the diameter of the hole 41 of the engaging member 4 is slightly smaller than the diameter of the shaft 31, as illustrated in FIG. 9. In addition, the distal end face of the shaft 31 of the rotor 3 abuts against a bottom of the casing 1 or the plug 14 and thus constitutes a motor. The ring magnet 33 of the rotor 3 of the motor and the poles of the stator bobbin 22 attract each other to retain the rotor 3 in place, thereby allowing stable rotation of the rotor 3.

Figure 10:
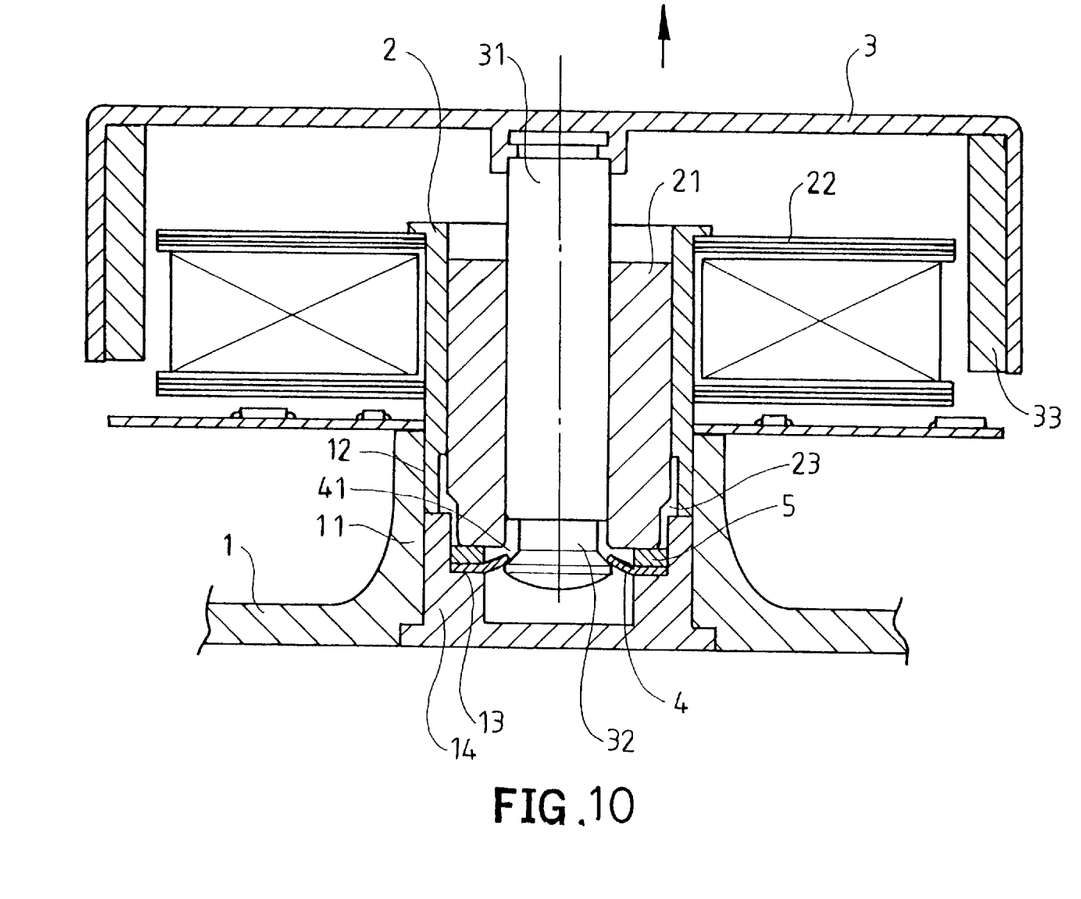
FIG. 10 is a sectional view illustrating detaching procedure of the first embodiment of the brushless motor in accordance with the present invention.

When detachment of the rotor 3 is required, as illustrated in FIG. 10, a relatively greater force can be applied to pull the rotor 3 outward. A side wall (not labeled) defining the annular groove 32 of the shaft 31 presses against the inner peripheral wall of the hole 41 of the engaging member 4 and thus causes outward deformation of the inner peripheral wall of the hole 41 of the engaging member 4. This allows easy removal of the rotor 3.

Figure 11:
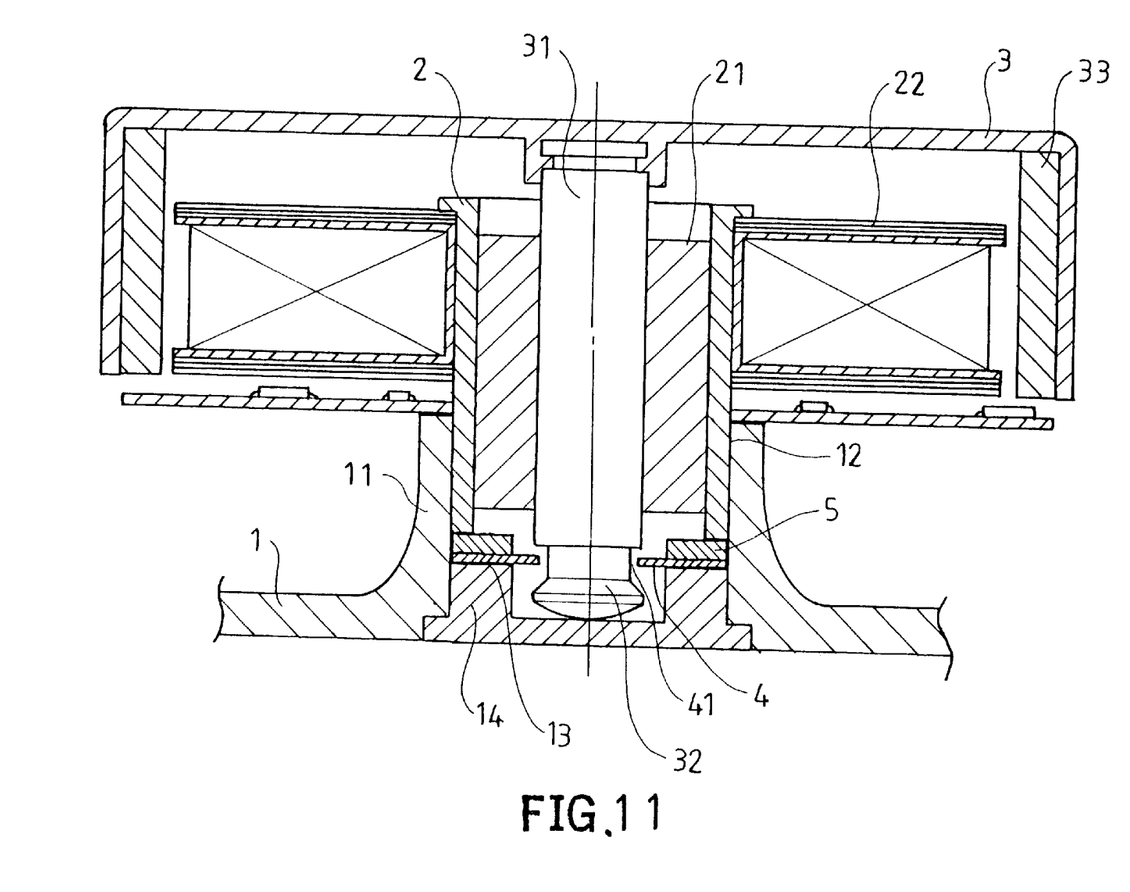
FIG. 11 is a sectional view illustrating assembly procedure of a second embodiment of the brushless motor in accordance with the present invention.

FIG. 11 illustrates a second embodiment of the present invention, wherein the brushless motor comprises a casing 1, an axle tube 2, a rotor 3, an engaging member 4, and a fixing ring 5. In this embodiment, the fixing ring 5 is pressed against by an end face of the axle tube 2 and thus is capable of retaining the engaging member 4 in place. The engaging member 4 prevents the rotor 3 from disengagement. Nevertheless, the engaging member 4 allows easy removal of the rotor 3 when required.

According to the above description, it is appreciated that the rotor can be fixed conveniently and rapidly. In addition, detachment of the rotor after assembly can be easily achieved by means of simply pulling the rotor outward without causing damage to other elements. Furthermore, the engaging member in accordance with the present invention is not tightly engaged in the annular groove of the shaft and thus will not rotate together with the rotor to thereby avoid rotational noise resulting from friction between the engaging member and the bearing or other padding member.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A brushless motor comprising:
  a casing including an axle seat with an axle hole, the axle hole having a flange provided therein;
  an axle tube engaged on the axle seat and including a bearing mounted therein;
  a rotor including a shaft rotatably received in the bearing, the shaft including a distal end that extends beyond an end face of the bearing, the distal end including a neck to thereby define an annular groove; and
  an engaging member mounted in the axle hole of the axle seat, the engaging member being retained in place by the bearing and including a hole having an inner diameter smaller than a diameter of the shaft of the rotor, an inner peripheral wall defining the hole of the engaging member including a plurality of notches to thereby allow forcible passage of the distal end of the shaft through the hole of the engaging member, the peripheral wall of the hole of the engaging member being located in the annular groove of the shaft after the distal end of the shaft is passed through the hole of the engaging member.

2. The brushless motor as claimed in claim 1, further comprising a fixing ring that is pressed against by the bearing and presses against the engaging member, the fixing ring including a hole having an inner diameter greater than an inner diameter of the hole of the engaging member.

3. The brushless motor as claimed in claim 1, further comprising a plug for enclosing an end of the axle seat of the casing.

4. The brushless motor as claimed in claim 1, wherein the distal end of the shaft includes a spherical surface.

5. The brushless motor as claimed in claim 1, wherein the hole of the engaging member includes an inner diameter slightly greater than an outer diameter of the neck of the shaft such that the inner peripheral wall of the hole of the engaging member is not in contact with the neck of the shaft.

6. A brushless motor comprising:

casing including an axle seat with an axle hole, the axle hole having a flange provided therein;

an axle tube engaged on the axle seat and including a bearing mounted therein;

a rotor including a shaft rotatably received in the bearing, the shaft including a distal end that extends beyond an end face of the bearing, the distal end including a neck to thereby define an annular groove; and an engaging member mounted in the axle hole of the axle seat, the engaging member being retained by the axle tube to the flange and including a hole having an inner diameter smaller than a diameter of the shaft of the rotor, an inner peripheral wall defining the hole of the engaging member including a plurality of notches to thereby allow forcible passage of the distal end of the shaft through the hole of the engaging member, the peripheral wall of the hole of the engaging member being located in the annular groove of the shaft after the distal end of the shaft is passed through the hole of the engaging member.

7. The brushless motor as claimed in claim 1, further comprising a fixing ring that is pressed against by the axle tube and presses against the engaging member, the fixing ring including a hole having an inner diameter greater than an inner diameter of the hole of the engaging member.

8. The brushless motor as claimed in claim 6, further comprising a plug for enclosing an end of the axle seat of the casing.

9. The brushless motor as claimed in claim 6, wherein the distal end of the shaft includes a spherical surface.

10. The brushless motor as claimed in claim 6, wherein the hole of the engaging member includes an inner diameter slightly greater than an outer diameter of the neck of the shaft such that the inner peripheral wall of the hole of the engaging member is not in contact with the neck of the shaft.

* * * * *